US012719324B2

(12) United States Patent
Suto et al.

(10) Patent No.: US 12,719,324 B2
(45) Date of Patent: Aug. 25, 2026

(54) ROTARY ELECTRICAL MACHINE

(71) Applicant: Hitachi, Ltd., Tokyo (JP)

(72) Inventors: Tetsuya Suto, Tokyo (JP); Akeshi Takahashi, Tokyo (JP); Makoto Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 18/578,362

(22) PCT Filed: Aug. 1, 2022

(86) PCT No.: PCT/JP2022/029492
§ 371 (c)(1),
(2) Date: Jan. 11, 2024

(87) PCT Pub. No.: WO2023/026781
PCT Pub. Date: Mar. 2, 2023

(65) Prior Publication Data

US 2024/0322628 A1 Sep. 26, 2024

(30) Foreign Application Priority Data

Aug. 25, 2021 (JP) ................................ 2021-137136

(51) Int. Cl.
*H02K 3/28* (2006.01)
*H02K 1/16* (2006.01)
(Continued)

(52) U.S. Cl.
CPC ................ *H02K 3/28* (2013.01); *H02K 1/16* (2013.01); *H02K 5/203* (2021.01); *B60K 7/0007* (2013.01); *H02K 2203/09* (2013.01)

(58) Field of Classification Search
CPC ........... H02K 3/28; H02K 1/16; H02K 5/203; H02K 2203/09; H02K 5/225; H02K 21/16;
(Continued)

(56) References Cited

U.S. PATENT DOCUMENTS

2012/0161569 A1* 6/2012 Hisada .................... H02K 3/28
310/201
2013/0115118 A1 5/2013 Chien et al.
(Continued)

FOREIGN PATENT DOCUMENTS

JP 61-199145 U 12/1986
JP 04-101684 A 4/1992
(Continued)

OTHER PUBLICATIONS

Communication pursuant to Article 94(3) EPC issued on Jul. 28, 2025 for European Patent Application No. 22861072.1.
(Continued)

*Primary Examiner* — Thomas Truong
(74) *Attorney, Agent, or Firm* — Volpe Koenig

(57) ABSTRACT

A rotary electrical machine comprises a cylindrical stator that generates a magnetic field, a rotor that generates torque through the magnetic field, and a housing that accommodates the stator. The housing comprises a housing body covering an outer circumferential part of the stator, and a housing lid part attached to one end side of the housing body. The stator comprises a stator core having a plurality of teeth, and a stator coil mounted on the stator core, and the stator coil has a plurality of windings wound onto the plurality of teeth, and a crossover wire connecting at least two of the plurality of windings. The crossover wire comprises an insertion mechanism that is provided to the housing lid part and electrically connects end parts of the windings and an end part of the crossover wire through insertion contact.

10 Claims, 13 Drawing Sheets

(51) Int. Cl.
*H02K 5/20* (2006.01)
*B60K 7/00* (2006.01)

(58) Field of Classification Search
CPC .. H02K 3/522; H02K 2213/12; B60K 7/0007; B60K 2007/0038; B60K 2007/0061; Y02T 10/64
See application file for complete search history.

(56) References Cited

U.S. PATENT DOCUMENTS

| | | | | |
|---|---|---|---|---|
| 2014/0111037 | A1* | 4/2014 | Funakoshi | H02K 3/28 310/43 |
| 2016/0072350 | A1 | 3/2016 | Kim | |
| 2018/0198344 | A1 | 7/2018 | Yuan et al. | |
| 2018/0367008 | A1* | 12/2018 | Hwang | H02K 3/521 |
| 2021/0367473 | A1* | 11/2021 | Yoshimura | H02K 3/12 |

FOREIGN PATENT DOCUMENTS

| | | | |
|---|---|---|---|
| JP | 2016-059209 | A | 4/2016 |
| JP | 2020-167760 | A | 10/2020 |
| RU | 2540320 | C9 | 5/2014 |
| WO | 2019/021679 | A1 | 1/2019 |

OTHER PUBLICATIONS

International Preliminary Report on Patentability issued on Feb. 27, 2024 for PCT International Application No. PCT/JP2022/029492.

International Search Report, PCT/JP2022/029492, Oct. 11, 2022, 2 pgs.

Extended European Search Report issued on Feb. 28, 2025 for European Patent Application No. 22861072.1.

* cited by examiner

FIG. 4

| | OXYGEN-FREE COPPER C1020 | TOUGH PITCH COPPER C1100 | PHOSPHORUS DEOXIDIZED COPPER C1220 |
|---|---|---|---|
| COPPER PURITY | ≥99.96% | ≥99.90% | ≥99.90% |
| OXYGEN CONTENT | ≤0.001% | ABOUT 0.02 TO 0.05% | ≤0.01% |
| VOLUME RESISTIVITY (μΩm) | ○ 0.0171 | ○ 0.0171 | △ 0.0203 |
| THERMAL CONDUCTIVITY (W/(mK)) | ○ 391 | ○ 391 | △ 339 |
| SPECIFIC GRAVITY | 8.94 | 8.94 | 8.94 |
| WELDING/BRAZING | ○ | × HYDROGEN EMBRITTLEMENT AT 600°C OR HIGHER | ○ |
| COST | × | ○ | ○ |
| DISADVANTAGEOUS CONCLUSION | · SUSCEPTIBLE TO MARKET FLUCTUATION DUE TO HIGH COSTS | · DIFFICULTY IN WELDING DUE TO HYDROGEN EMBRITTLEMENT | · INCREASE IN RESISTANCE AND DETERIORATION IN CONDUCTIVITY |
| MAIN USE | ELECTRONIC DEVICE, AUDIO DEVICE | COPPER WIRE, APPARATUS COMPONENT, ETC | GASKET, WATER HEATER, AIR CONDITIONING PIPING, ETC |

XII-XII CROSS SECTION

XIII-XIII CROSS SECTION

ROTARY ELECTRICAL MACHINE

TECHNICAL FIELD

The present invention relates to a rotary electrical machine.

BACKGROUND ART

PTL 1 discloses a busbar unit in which crossover parts of a plurality of U-phase, V-phase, and W-phase busbars are arranged so as not to overlap each other on the same plane. The busbar unit is formed by molding synthetic resin.

In addition, PTL 1 describes that a U-shaped connection part of the busbar unit is caused to engage with a winding end part of a concentrated wound winding, and the winding end part and the connection part are connected by fusing processing of pressurizing and heating the connection part to sandwich the winding end part.

CITATION LIST

Patent Literature

PTL 1: JP 2016-59209 A

SUMMARY OF INVENTION

Technical Problem

As described in PTL 1, in a technology that connects a connection part of a busbar unit to a winding end part of a winding by fusing processing, connection work of the busbar unit and the winding of each phase demands time and effort, and thus there is room for improvement from the viewpoint of assemblability.

An object of the present invention is to improve assemblability of a rotary electrical machine.

Solution to Problem

A rotary electrical machine according to an aspect of the present invention includes a cylindrical stator that generates a magnetic field, a rotor that generates torque through the magnetic field, and a housing that accommodates the stator. The housing includes a housing body that covers an outer circumferential part of the stator, and a housing lid part attached to one end side of the housing body. The stator includes a stator core having a plurality of teeth, and a stator coil mounted on the stator core. The stator coil has a plurality of windings wound onto the plurality of teeth, and crossover wires that are each provided to connect at least two of the plurality of windings. The crossover wires are provided in the housing lid part. The rotary electrical machine includes an insertion mechanism that electrically connects end parts of the windings and an end part of each of the crossover wires through insertion contact.

Advantageous Effects of Invention

According to the present invention, assemblability of a rotary electrical machine can be improved.

BRIEF DESCRIPTION OF DRAWINGS

FIG. 4 is a table comparing oxygen-free copper JIS-H 3100 (C1020), tough pitch copper JIS-H 3100 (C1100), and phosphorus deoxidized copper JIS-H 3100 (C1220).

DESCRIPTION OF EMBODIMENTS

Hereinafter, a rotary electrical machine according to an embodiment of the present invention will be described with reference to the drawings. In order to illustrate a relationship between orientations of configurations in each drawing, an X axis, a Y axis, and a Z axis orthogonal to each other are illustrated.

Figure 1:
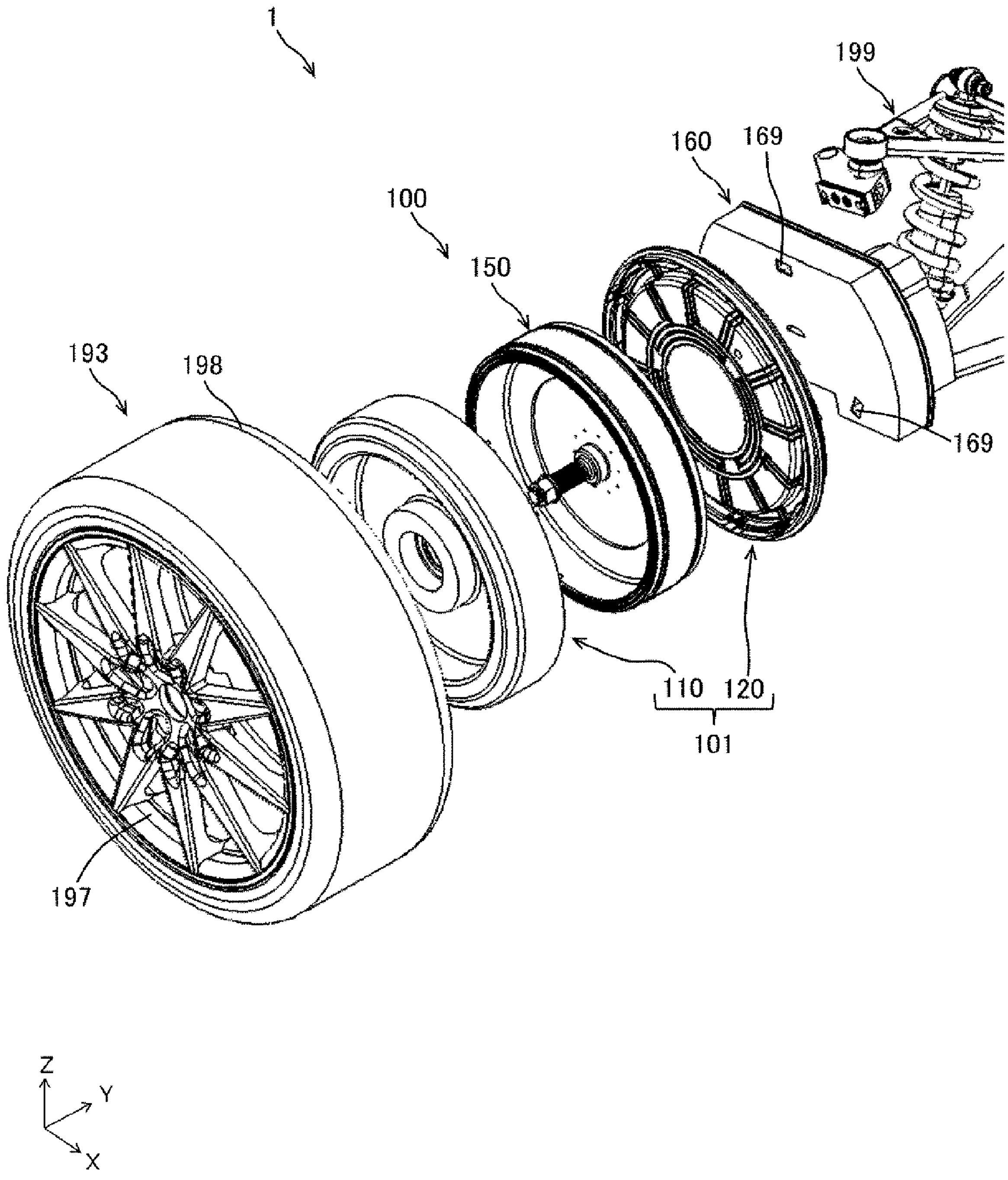
FIG. 1 is an exploded perspective view of an electric wheel system including an in-wheel motor illustrated as an example of a rotary electrical machine according to an embodiment of the present invention.

FIG. 1 is an exploded perspective view of an electric wheel system 1 including an in-wheel motor 100 illustrated as an example of the rotary electrical machine according to the embodiment of the present invention. As illustrated in FIG. 1, the electric wheel system 1 used in an automobile includes a wheel 197 to which a tire 198 is attached, the in-wheel motor 100 provided inside the wheel 197, an inverter 160 provided on a side part of the in-wheel motor 100, and a vehicle suspension 199 that connects the wheel 193 and a vehicle body (not illustrated).

The inverter 160 converts DC power from a power supply device (not illustrated) such as a battery into AC power and supplies the AC power to the in-wheel motor 100. When the AC power is supplied from the inverter 160 to the in-wheel motor 100, the rotor 150 of the in-wheel motor 100 rotates. The wheel 197 is connected to the rotor 150 of the in-wheel motor 100, and a rotational force of the rotor 150 is transmitted to the wheel 197, thereby rotating the wheel 193.

Hereinafter, the in-wheel motor 100 according to the present embodiment will be described in detail with reference to the drawings. In the present specification, an "axial direction", a "circumferential direction", and a "radial direction" are as follows. The "axial direction" is a direction along a rotation center axis (hereinafter, also simply referred to as a rotation axis) O of the rotor 150. The axial direction corresponds to a Y-axis direction. The "circumferential direction" is a direction along the rotational direction of the rotor 150, that is, a circumferential direction around the rotation axis O. The "radial direction" is a direction orthogonal to the rotation axis O, that is, a radial direction of a circle around the rotation axis O. In addition, an "inner circumferential side" refers to a radially inner side (inner diameter side), and an "outer circumferential side" refers to the side opposite thereto, that is, a radially outer side (outer diameter side).

Figure 2:
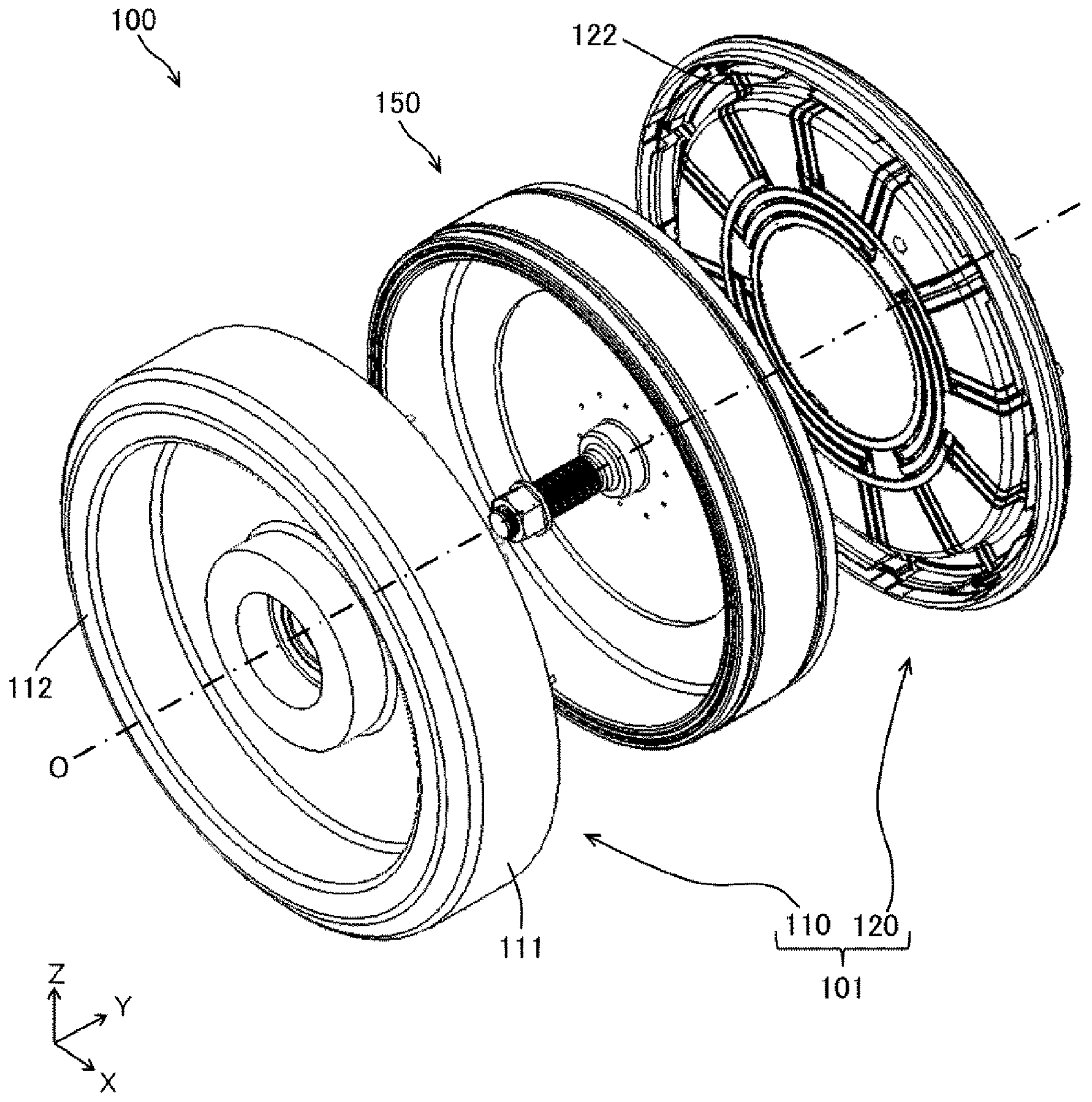
FIG. 2 is an exploded perspective view of the in-wheel motor.
Figure 3:
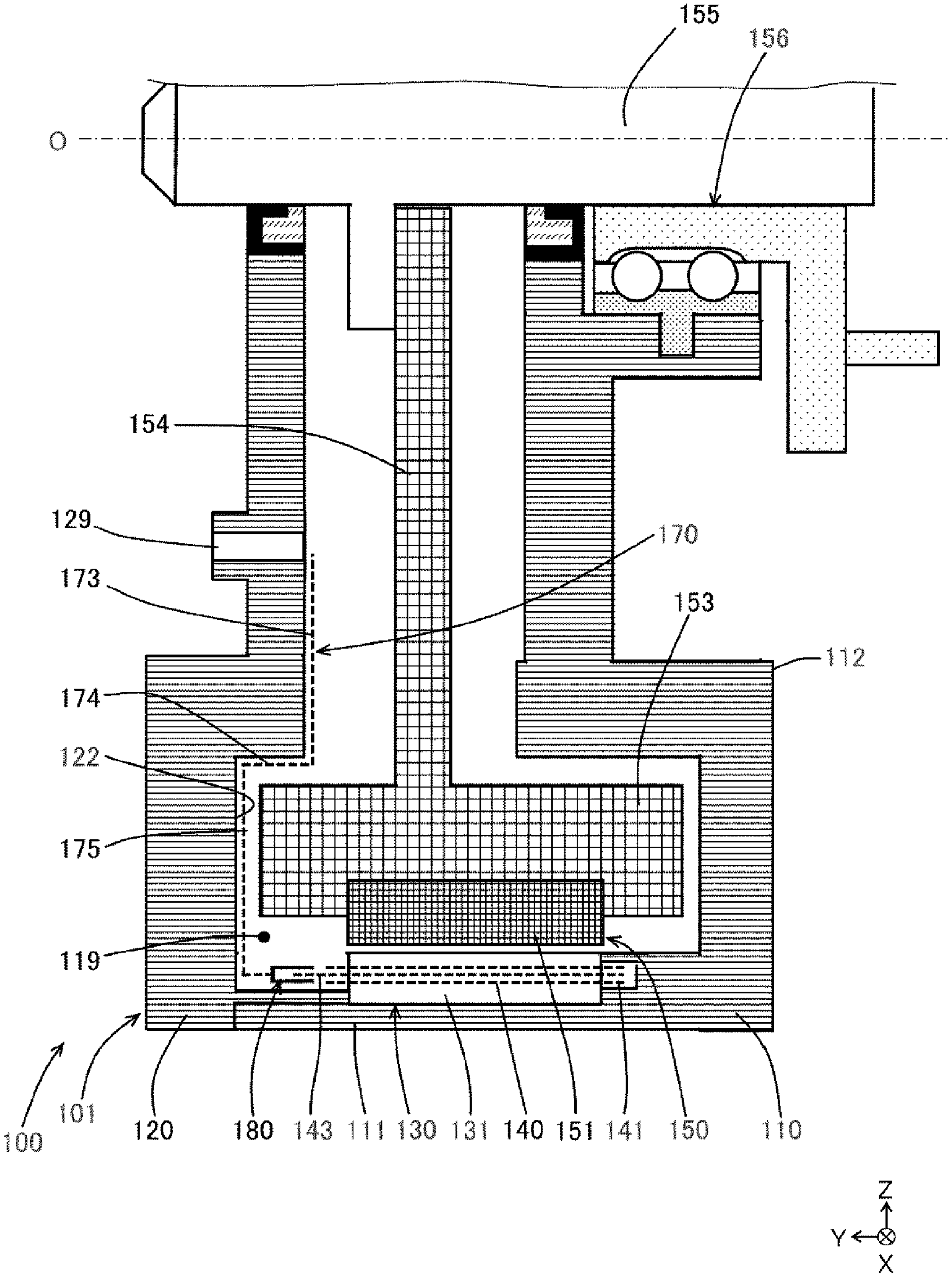
FIG. 3 is a schematic cross-sectional side view of the in-wheel motor and schematically illustrates a cross section cut along a plane parallel to a rotation axis of the in-wheel motor.

FIG. 2 is an exploded perspective view of the in-wheel motor 100. FIG. 3 is a schematic cross-sectional side view of the in-wheel motor 100 and schematically illustrates a cross section cut along a plane parallel to the rotation axis O of the in-wheel motor 100. As illustrated in FIGS. 2 and 3, the in-wheel motor 100 is a three-phase AC motor and includes a cylindrical stator 130 (see FIG. 3) fixed to a housing 101, the rotor 150 rotatably provided on the inner circumferential side of the stator 130 with a gap therebetween, and the housing 101 that accommodates the stator 130 and the rotor 150.

The housing 101 includes a bottomed cylindrical housing body 110 and a disk-shaped housing lid part 120 attached to one end side of the housing body 110 to close an opening on the one end side of the housing body 110. The housing body 110 and the housing lid part 120 are fastened by a plurality of screws. Note that, since the housing body 110 and the housing lid part 120 need to be accurately aligned, it is preferable to employ a spigot structure or prevent occurrence of positional displacement due to a positioning pin or the like.

The housing body 110 includes a cylindrical part 111 that has a cylindrical shape and covers an outer circumferential part of the cylindrical stator 130 and a bottom part 112 provided on a side of the cylindrical part 111 opposite to a side to which the housing lid part 120 is attached. Note that an annular recess in which the stator 130 and the rotor 150 are arranged is formed in the bottom part 112. In the present embodiment, the cylindrical part 111 and the bottom part 112 are formed by integral molding. Note that the cylindrical part 111 and the bottom part 112 may be formed as separate members. In this case, the cylindrical part 111 and the bottom part 112 are fixed by screws or the like.

The housing lid part 120 is a disk-shaped member and has an annular recess (hereinafter, referred to as an annular recess) 122 formed in the vicinity of an outer circumferential part thereof. As illustrated in FIG. 3, an insertion mechanism 180 that is a connection part between a lead wire 143 of a winding 141 of a stator coil 140 to be described below and a busbar 170 is disposed in the annular recess 122. In FIG. 3, the stator coil 140 and the busbar 170 are schematically illustrated by broken lines.

The housing 101 is preferably made of a material having high heat conductivity such as aluminum or a magnesium alloy. Note that the material of the housing 101 is not limited thereto, and carbon steel, resin, or the like may be adopted.

The stator 130 includes a cylindrical stator core 131 and the stator coil 140 attached to the stator core 131. The stator coil 140 includes a U-phase coil, a V-phase coil, and a W-phase coil. The stator coil 140 is, for example, a conductive wire containing copper or aluminum as a main component which is coated with an insulating film. As a material of the insulation film of the stator coil 140, for example, an engineering plastic such as polyimide can be adopted.

The stator core 131 includes a cylindrical yoke 133 (see FIGS. 5 and 7) and a plurality of teeth 132 (see FIGS. 5 and 7) projecting from the yoke 133 toward the rotation axis O. The teeth 132 form a magnetic path in the radial direction, and the yoke 133 forms a magnetic path in the circumferential direction. The teeth 132 guide a rotating magnetic field generated by the stator coil 140 to the rotor 150. The rotor 150 generates rotation torque by the rotating magnetic field.

The conductive wire constituting the stator coil 140 is wound around the teeth 132 by a concentrated winding method. By winding a conductive wire around each of the plurality of teeth 132, a plurality of windings (concentrated winding coils) 141 (see FIGS. 5 and 7) are formed. As the conductive wire, an angular wire having a rectangular cross section or a round wire having a circular cross section can be employed. The winding 141 according to the present embodiment is a rectangular wire longitudinal-winding coil (edgewise coil) obtained by winding a rectangular wire having an insulating film, which is a magnet wire having a rectangular cross section, in a direction in which bending is difficult on an edge side (short side) by bending.

The winding 141 may be formed by winding a magnet wire around a bobbin mounted to cover the teeth 132. The bobbin is formed of a material having insulation properties (for example, resin). In addition, the winding 141 may be formed by a plate-shaped conductive member by press working or the like. In this case, an insulating material is applied to a molded conductive wire or powder coating with an insulating material is performed to form an insulating film on a surface of the conductive wire.

The coil of each phase (U-phase, V-phase, W-phase) is formed by connecting the plurality of in-phase windings 141, respectively. Each of the plurality of windings 141 has a connecting end part on one axial end side (housing lid part 120 side) of the stator 130. The connecting end part of one winding 141 is connected to a connecting end part of another winding 141 of the same phase disposed adjacent to the one winding 141. In the in-wheel motor 100 according to the present embodiment, at least two windings 141 are formed to be continuous by connecting the connecting end parts of the adjacent in-phase windings 141. The connecting end parts of the adjacent in-phase windings 141 may be connected by welding (welding adhesion) such as TIG welding, brazing, electron beam welding, or laser welding, or may be connected by a method other than welding. In the present embodiment, as will be described below, the winding 141 and the busbar 170 are connected without performing welding. Therefore, it is preferable that the adjacent in-phase windings 141 be connected by a method other than welding. When the adjacent in-phase windings 141 are not welded to each other, not only oxygen-free copper but also tough pitch copper can be selected as the material of the stator coil 140.

FIG. 4 is a table comparing oxygen-free copper JIS-H 3100 (C1020), tough pitch copper JIS-H 3100 (C1100), and phosphorus deoxidized copper JIS-H 3100 (C1220). A material having a copper purity of 99.90% or higher is called pure copper, and typical pure copper includes oxygen-free copper, tough pitch copper, and phosphorus deoxidized copper. Tough pitch copper has a lower volume resistivity than phosphorus deoxidized copper and is less costly than oxygen-free copper and thus has high versatility. However, tough pitch copper causes hydrogen embrittlement at a high temperature of 600° C. or higher and therefore is difficult to weld. Phosphorus deoxidized copper is less costly than oxygen-free copper and does not cause hydrogen embrittlement during welding. However, phosphorus deoxidized copper has a volume resistivity higher by about 20% than that of oxygen-free copper and tough pitch copper, has a high calorific value when a high current is applied, and thus is not suitable as a material of the stator coil 140. Oxygen free copper has a lower volume resistivity than phosphorus deoxidized copper and does not cause hydrogen embrittlement during welding. However, oxygen-free copper is more costly than tough pitch copper and phosphorus deoxidized copper and is also susceptible to market fluctuations.

In the present embodiment, as will be described below, the winding 141 and the busbar 170 can be connected without performing welding. Therefore, by employing a method other than the welding as a method of connecting the adjacent in-phase windings 141, tough pitch copper can be used for the stator coil 140. As a result, it is possible to provide the low-cost in-wheel motor 100 having favorable electrical characteristics.

The stator core 131 illustrated in FIG. 3 is made of a magnetic material. In the present embodiment, the stator core 131 is formed by stacking a plurality of annular electromagnetic steel sheets. The stator core 131 may be formed of a powder magnetic core obtained by compression-molding metal magnetic particles subjected to insulating coating. The stator core 131 is fitted and fixed to the inner diameter side of the cylindrical part 111 of the housing body 110 by shrink fitting, press fitting, or the like.

As illustrated in FIG. 3, the rotor 150 includes a cylindrical rotor core 151 and a plurality of permanent magnets (not illustrated) mounted on the rotor core 151. The rotor core 151 is formed of a magnetic material. In the present embodiment, the rotor core 151 is formed by stacking a plurality of annular electromagnetic steel sheets. Note that the rotor core 151 may be formed of a powder magnetic core obtained by compression-molding metal magnetic particles subjected to insulating coating. An outer circumferential surface of the rotor core 151 faces a distal end surface of each of the teeth 132, which is an inner circumferential surface of the stator core 131, via a gap. The permanent magnet forms a field pole of the rotor 150.

Each of the U-phase, V-phase, and W-phase coils is connected to the inverter 160. DC power from a battery (not illustrated) is converted into AC power by the inverter 160 and supplied to the coils of the respective phases, and thereby a rotating magnetic field is generated, and the rotor 150 rotates around the rotation axis O. The rotor 150 is held by a rotor holding member 153. The rotor holding member 153 is connected to a shaft 155 via a connection member 154. The shaft 155 projects toward one side from the housing 101. A hub 156 is attached to a projecting part of the shaft 155, and a wheel 197 (see FIG. 1) is attached to the hub 156.

Figure 5:
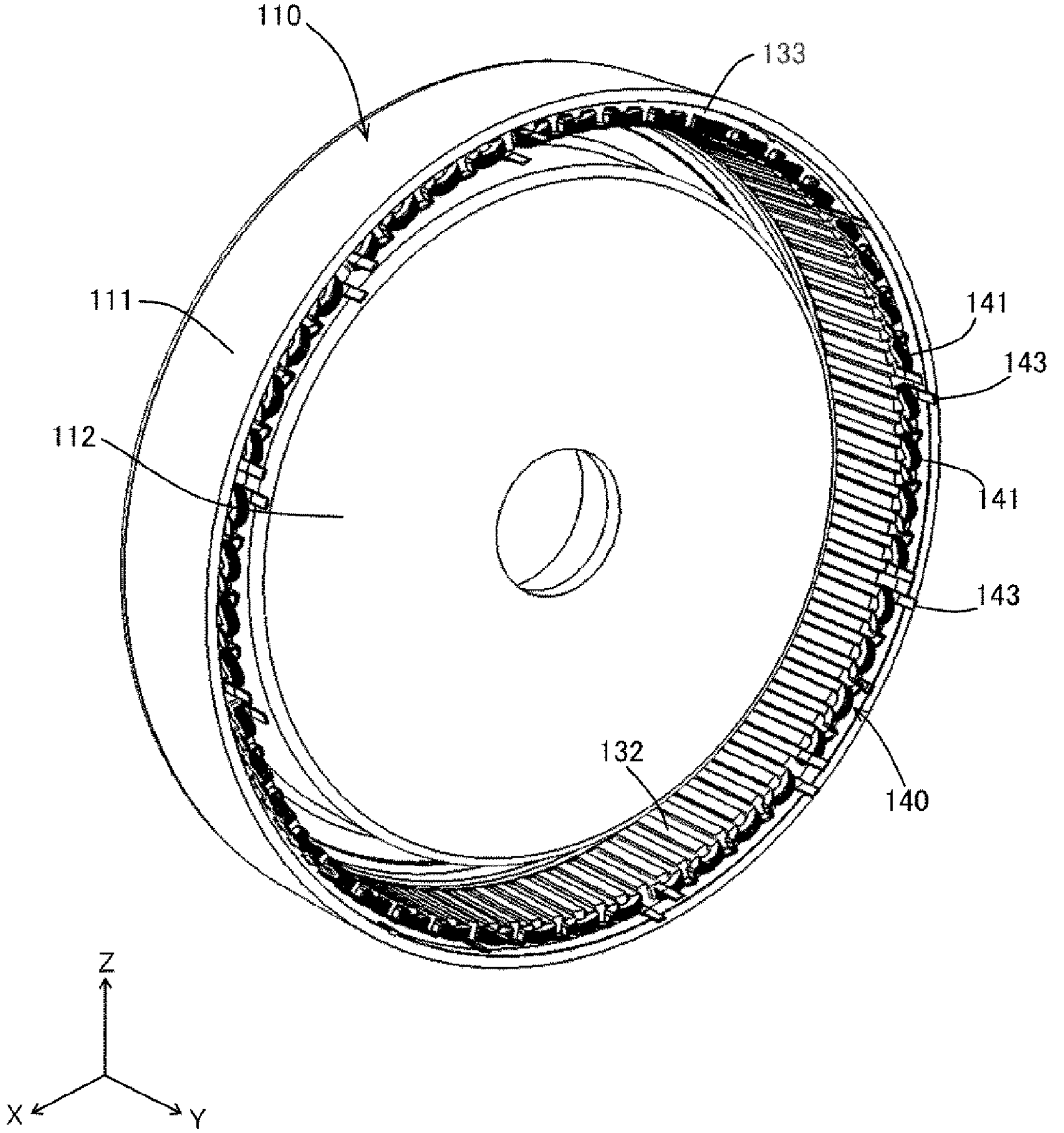
FIG. 5 is a perspective view of a housing body.

FIG. 5 is a perspective view of the housing body 110. As illustrated in FIG. 5, the housing body 110 is configured as a container that accommodates the stator core 131 and the stator coil 140 mounted on the stator core 131.

Figure 6:
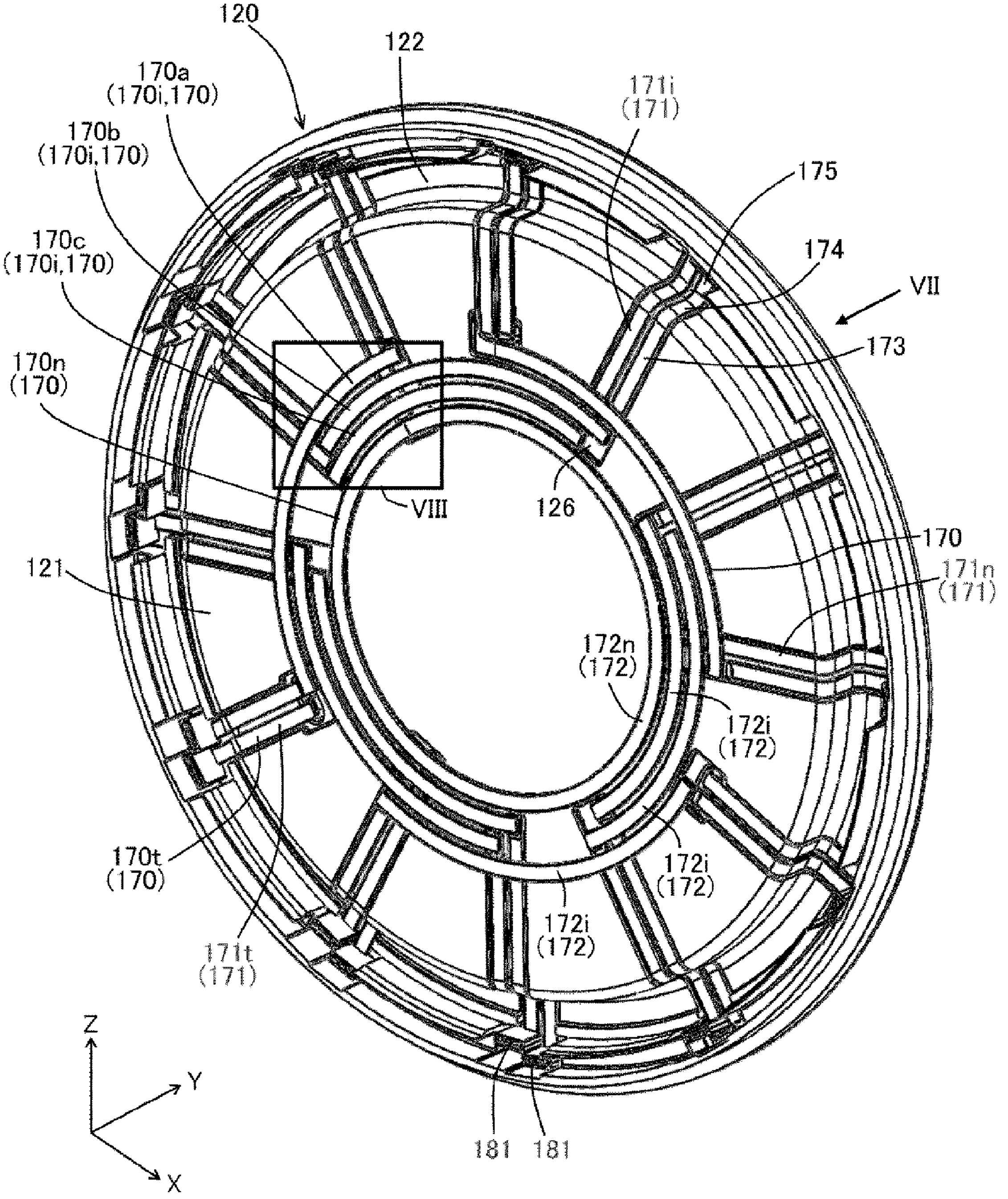
FIG. 6 is a perspective view of a housing lid part.

FIG. 6 is a perspective view of the housing lid part 120. The housing lid part 120 illustrated in FIG. 6 is fitted and fixed into an opening part on one end side of the housing body 110 in the axial direction (see FIG. 3). Note that the housing lid part 120 may be fixed to the housing body 110 by a screw or the like.

Figure 13:
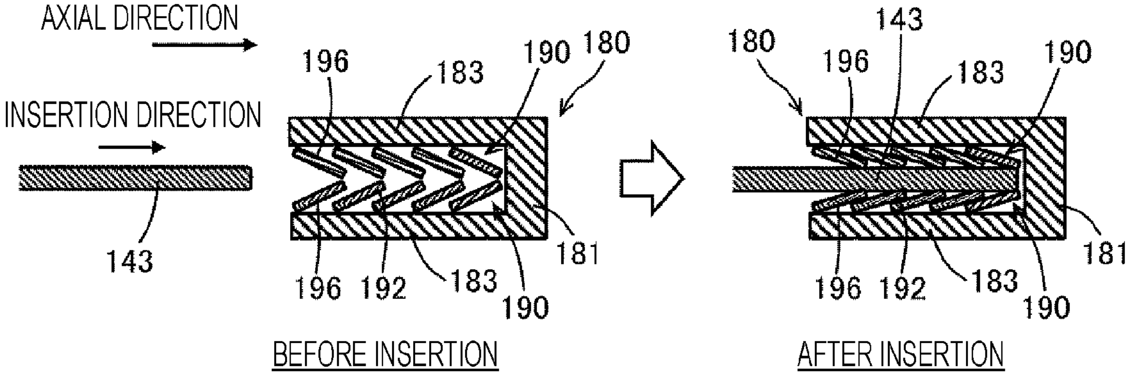
FIG. 13 is a view for illustrating a connection structure between a spring terminal of the insertion mechanism and a lead wire of a winding and illustrates a cross section along line XIII-XIII in FIG. 11.

In the present embodiment, when the housing lid part 120 is attached to the housing body 110, the lead wires 143 (see FIG. 5), which are the end parts of the plurality of windings 141 arranged in the housing body 110, and end parts of the busbars 170 (see FIG. 6), which are crossover wires provided in the housing lid part 120, are electrically connected through insertion contact by the insertion mechanism 180 (see FIG. 13).

The stator coil 140 is formed by connecting the plurality of windings 141 constituting the U-phase coil, the V-phase coil, and the W-phase coil in a star connection by the plurality of busbars 170. That is, the housing lid part 120 according to the present embodiment has a function as a connection plate that holds the busbars (crossover wires) 170 used for connection of the plurality of windings 141.

Figure 7:
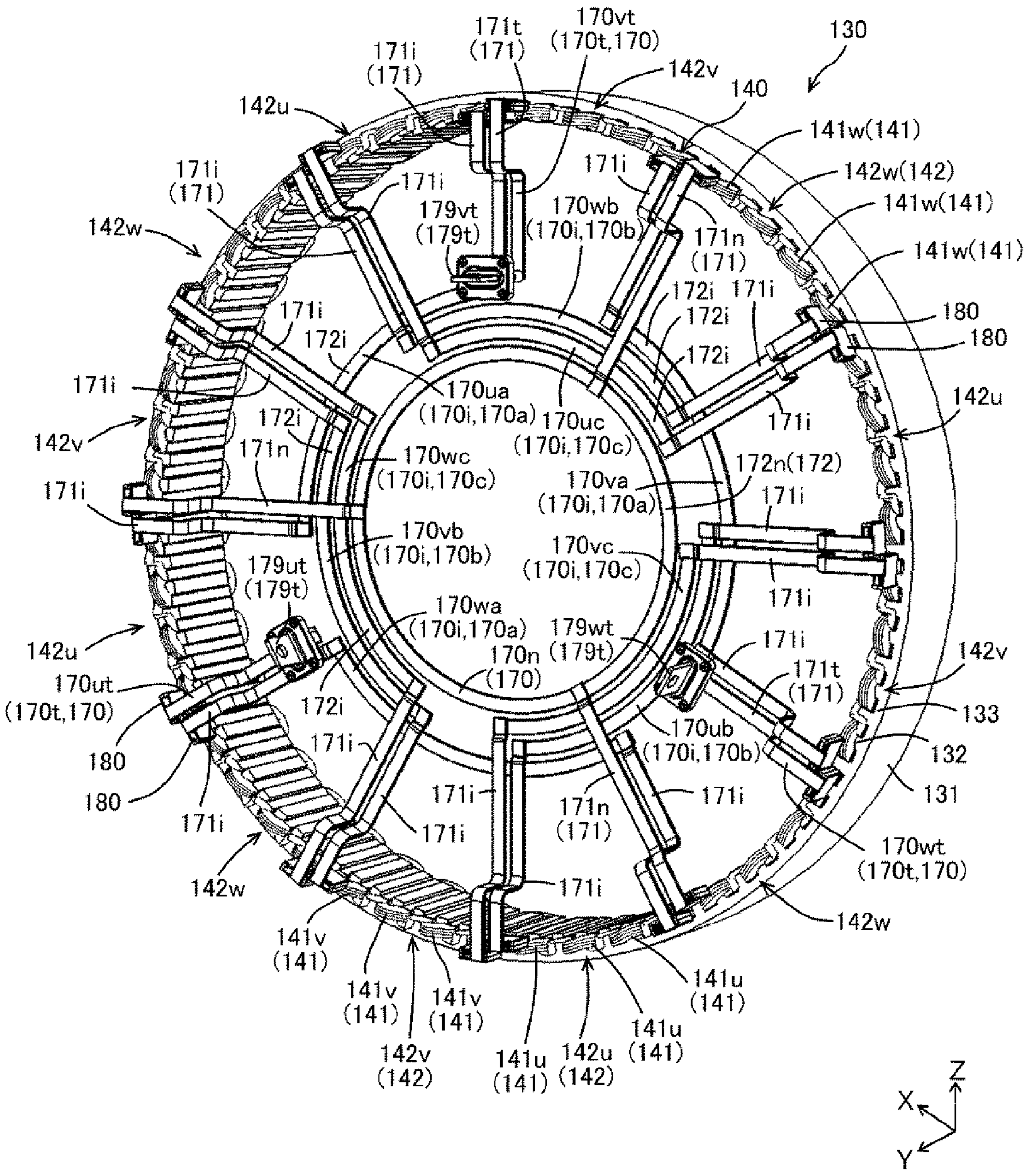
FIG. 7 is a perspective view illustrating a stator coil and a stator core connected in a star connection.

A connection structure of the stator coil 140 will be described with reference to FIG. 7. FIG. 7 is a perspective view illustrating the stator coil 140 and the stator core 131 connected in the star connection and is a view as viewed from direction VII in FIG. 6. In the stator coil 140 according to the present embodiment, four winding groups 142 of phases (U-phase, V-phase, W-phase) are provided. Each of the winding groups 142 includes a plurality of in-phase windings 141 continuously arranged in the circumferential direction.

In the example illustrated in FIG. 7, the stator coil 140 includes four U-phase winding groups 142*u*, four V-phase winding groups 142*v*, and four W-phase winding groups 142*w*. The U-phase winding group 142*u* has a plurality of U-phase windings 141*u* arranged continuously in the circumferential direction, the V-phase winding group 142*v* has a plurality of V-phase windings 141*v* arranged continuously in the circumferential direction, and the W-phase winding group 142*w* has a plurality of W-phase windings 141*w* arranged continuously in the circumferential direction.

Of the plurality of in-phase windings 141 constituting the winding group 142, the windings 141 arranged at both ends are connected to the busbar 170. The busbar 170 is formed, for example, by molding a rectangular wire having an insulating film which is a magnet wire having a rectangular cross section. The busbar 170 may be made of a plate-shaped conductive member by press working or the like. In this case, an insulating material is applied to a molded busbar 170 or powder coating with an insulating material is performed to form an insulating film on a surface of the busbar 170.

The plurality of busbars 170 include nine in-phase connecting busbars 170*i*, one neutral-point connecting busbar 170*n*, and three terminal connecting busbars 170*t*. The nine in-phase connecting busbars 170*i* include three U-phase connecting busbars 170*ua*, 170*ub*, and 170*uc*, three V-phase connecting busbars 170*va*, 170*vb*, and 170*vc*, and three W-phase connecting busbars 170*wa*, 170*wb*, and 170*wc*. The three terminal connecting busbars 170*t* include one U-phase terminal connecting busbar 170*ut*, one V-phase terminal connecting busbar 170*vt*, and one W-phase terminal connecting busbar 170*wt*.

Since the U-phase connecting busbar 170*ua*, the V-phase connecting busbar 170*va*, and the W-phase connecting busbar 170*wa* have the same shape, the connecting busbars are also collectively referred to as first in-phase busbars 170*a*. Since the U-phase connecting busbar 170*ub*, the V-phase connecting busbar 170*vb*, and the W-phase connecting busbar 170*wb* have the same shape, the connecting busbars are also collectively referred to as second in-phase busbars 170*b*. Since the U-phase connecting busbar 170*uc*, the V-phase connecting busbar 170*vc*, and the W-phase connecting busbar 170*wc* have the same shape, the connecting busbars are also collectively referred to as third in-phase busbars 170*c*.

Note that the first in-phase busbars 170*a*, the second in-phase busbars 170*b*, and the third in-phase busbars 170*c* have the same configuration although having different dimensions.

The in-phase connecting busbars 170*i* connect the two in-phase winding groups 142. The neutral-point connecting busbar 170*n* connects the windings (three windings 141*u*,

141v, and 141w), which are the winding ends of the coils of the respective phases (U-phase, V-phase, W-phase). The in-phase connecting busbars 170i and the neutral-point connecting busbar 170n are crossover wires that connect at least two of the plurality of windings 141.

Each of the terminal connecting busbars 170t (170ut, 170vt, and 170wt) is a crossover wires that connects the winding 141, which is a winding start of the coil of each phase (U-phase, V-phase, or W-phase), and a motor-side AC terminal 179t (U-phase AC terminal 179ut, V-phase AC terminal 179vt, or W-phase AC terminal 179wt) of each phase. The motor-side AC terminal 179t is connected to an inverter-side AC terminal 169 (see FIG. 1) provided in the inverter 160.

The in-phase connecting busbar 170i has a pair of radial parts 171i provided in the radial direction of the rotor 150 and an arc-shaped part circumferential 172i provided in the circumferential direction of the rotor 150. Both end parts of the circumferential part 172i are fixed to a proximal end part of the radial part 171i on a side opposite to a connection side with the winding 141. That is, the circumferential part 172i is a connection part that connects proximal end parts of the pair of radial parts 171i. A distal end part of the radial part 171i present from the circumferential part 172i in the radial direction of the rotor 150 is electrically connected to the lead wire 143 (see FIG. 5) of the winding 141 by the insertion mechanism 180 to be described below, as an end part of the busbar (crossover wire) 170.

The neutral-point connecting busbar 170n has three radial parts 171n provided in the radial direction of the rotor 150 and an annular circumferential part 172n provided in the circumferential direction of the rotor 150. The circumferential part 172n is a connection part that connects proximal end parts of the three radial parts 171n. The proximal end parts of the radial parts 171n are end parts of the radial parts 171n on a side opposite to the connection side with the winding 141. The three radial parts 171n are connected to the circumferential part 172n at intervals of 120° in the circumferential direction. A distal end part of the radial part 171n extending from the circumferential part 172n in the radial direction of the rotor 150 is electrically connected to the lead wire 143 (see FIG. 5) of the winding 141 by the insertion mechanism 180 to be described below, as an end part of the busbar (crossover wire) 170.

The terminal connecting busbar 170t has a single radial part 171t provided in the radial direction of the rotor 150 and the motor-side AC terminal 179t. A proximal end part of the radial part 171t is electrically connected to the motor-side AC terminal 179t, and a distal end part thereof is electrically connected to the lead wire 143 (see FIG. 5) of the winding 141 by the insertion mechanism 180 to be described below, as an end part of the busbar (crossover wire).

Although the radial part 171i of the in-phase connecting busbar 170i, the radial part 171n of the neutral-point connecting busbar 170n, and the radial part 171t of the terminal connecting busbar 170t have different dimensions, the radial parts have similar configurations. Therefore, hereinafter, the radial parts are also collectively referred to as the radial parts 171. In addition, although the circumferential part 172i of the in-phase connecting busbar 170i and the circumferential part 172n of the neutral-point connecting busbar 170n have different shapes and dimensions, the circumferential parts are members which are provided in the circumferential direction and to which the radial parts 171 are connected in common. Therefore, hereinafter, the circumferential parts are also collectively referred to as the circumferential parts 172.

Figure 8:
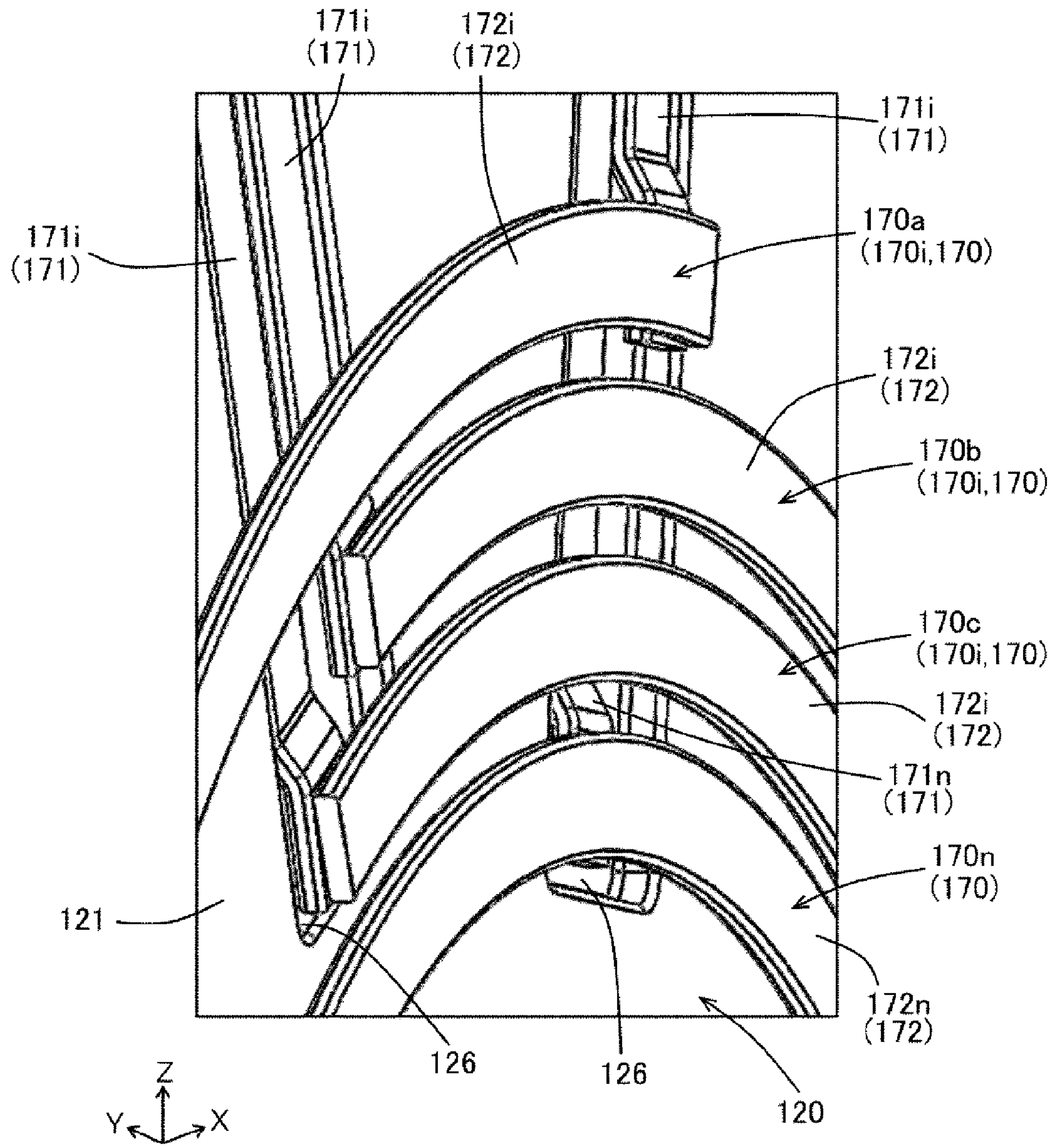
FIG. 8 is an enlarged perspective view of portion VIII in FIG. 6.

The arrangement of the busbars 170 will be described with reference to FIGS. 6 and 8. FIG. 8 is an enlarged perspective view of portion VIII in FIG. 6. As illustrated in FIGS. 6 and 8, the circumferential parts 172 of the respective busbars 170 are arranged on the same plane and are arranged side by side in the radial direction. The circumferential part 172 of the first in-phase busbar 170a, the circumferential part 172 of the second in-phase busbar 170b, the circumferential part 172 of the third in-phase busbar 170c, and the circumferential part 172 of the neutral-point connecting busbar 170n are arranged in this order from outside to inside in the radial direction.

The busbar 170 can be formed, for example, by individually forming the radial part 171 and the circumferential part 172 and connecting the parts by welding, friction bonding, or the like. Note that the method of forming the busbar 170 is not limited thereto. For example, the busbar 170 having the radial part 171 and the circumferential part 172 may be formed by bending a single rectangular wire. If manufacturing processes of the busbar 170 does not include a processing process performed at a high temperature such as welding, tough pitch copper can be used as the material of the busbar 170.

A main surface 121 of the housing lid part 120 on the housing body 110 side has a recess 126 in which the radial parts 171 of the busbars 170 are arranged is formed. The radial part 171 which is a part of the busbar 170 is fixed to the recess 126 of the housing lid part 120 with an adhesive in a state of being in contact with a bottom surface of the recess 126. By fixing the radial part 171 to the housing lid part 120, the radial part 171 functions as a strength member that improves rigidity of the housing lid part 120. A fixing method of the radial part 171 to the housing lid part 120 is not limited to the fixing method using an adhesive. The radial part 171 may be fixed to the housing lid part 120 by resin molding or may be fixed to the housing lid part 120 by bolt fastening.

In a case where the housing lid part 120 is made of metal, a ground fault occurs when the busbar 170 is electrically connected to the housing lid part 120, and thus the insulating film of the busbar 170 needs to have sufficient strength and withstand voltage. The insulating film of the busbar 170 can be formed by powder coating or varnish impregnation of an insulating material. In addition, the insulating film may be formed on the surface of the busbar 170 with an epoxy-based adhesive or the like.

As illustrated in FIG. 6, the plurality of radial parts 171 are arranged to radially extend around the rotation axis O of the rotor 150. The plurality of circumferential parts 172 are arranged at positions slightly away from the main surface 121. That is, the circumferential parts 172 are arranged at positions farther away from the housing lid part 120 than the radial parts 171 arranged in the recess 126.

As illustrated in FIGS. 6 and 8, since the radial parts 171 are arranged in the recess 126, one busbar 170 and another busbar 170 do not interfere with each other at an intersecting position, even when the radial part 171 of the one busbar 170 and the circumferential part 172 of the other busbar 170 intersect each other. Consequently, the plurality of circumferential parts 172 can be arranged on the same plane. As a result, an axial length of the in-wheel motor 100 can be shortened.

As described above, the housing lid part 120 has the annular recess 122 (see FIGS. 3 and 6). Therefore, the recess 126 and the radial parts 171 are formed along a shape of the annular recess 122. As illustrated in FIGS. 3 and 6, each of the radial parts 171 includes a first straight part 173 formed along the main surface 121 of the housing lid part 120, a second straight part 174 which is bent at 90° from the first straight part 173 along the shape of the annular recess 122 and extends in the axial direction of the rotor 150, and a third straight part 175 which is bent at 90° from the second straight part 174 along the shape of the annular recess 122 and extends in the radial direction of the rotor 150.

Figure 9:
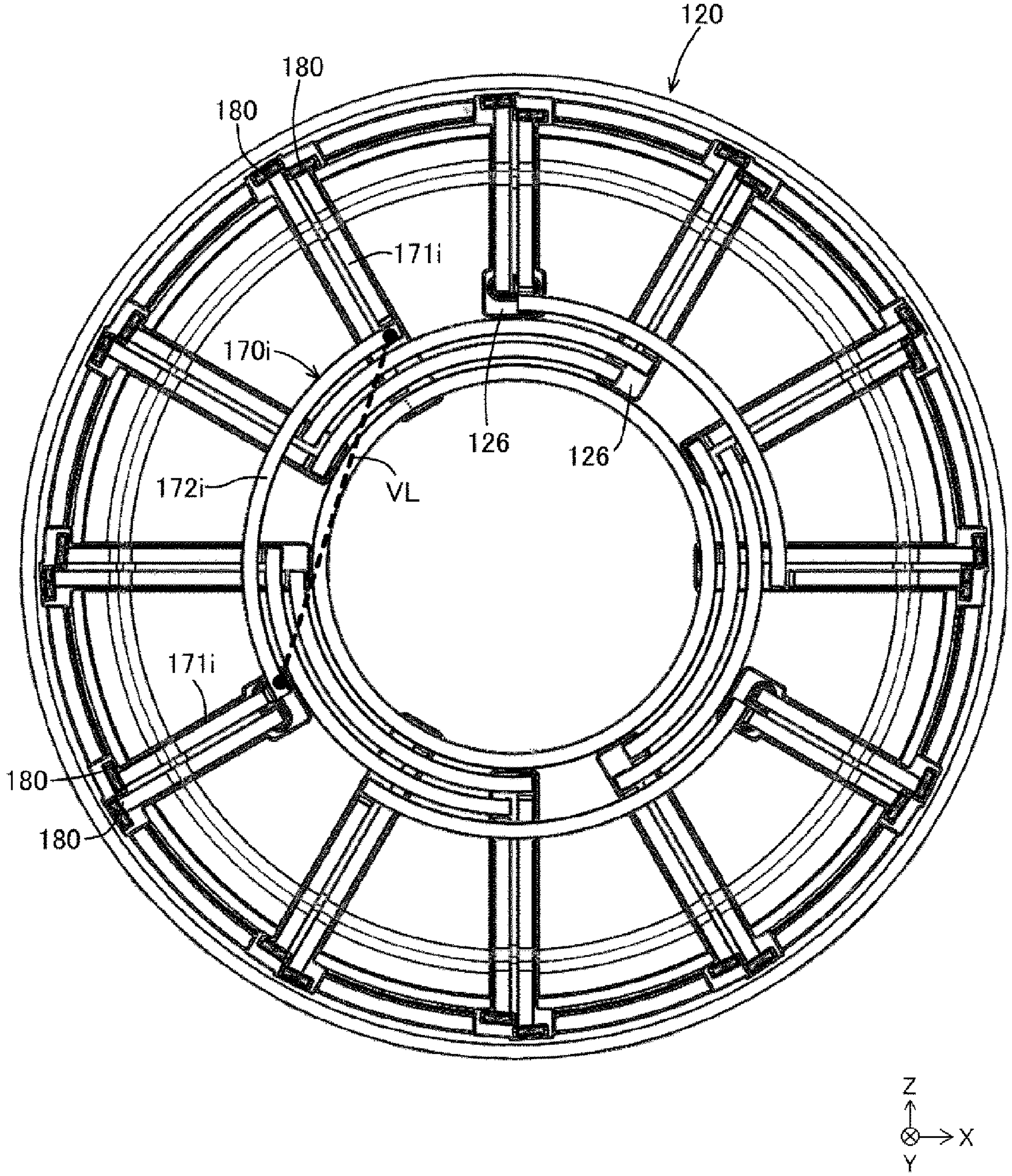
FIG. 9 is a view of the housing lid part as viewed from an axial direction.

FIG. 9 is a view of the housing lid part 120 as viewed from the axial direction. As illustrated in FIG. 9, a central part of the circumferential part 172*i* of the in-phase connecting busbar 170*i* is disposed radially outward from an imaginary line VL connecting both end parts of the circumferential part 172*i*. The circumferential part 172*i* is not fixed to the housing lid part 120. Therefore, the circumferential part 172*i* can be relatively displaced with respect to the housing lid part 120.

With this configuration, in a case where the in-phase connecting busbar 170*i* and the housing lid part 120 are made of different materials, a thermal expansion difference between the in-phase connecting busbar 170*i* and the housing lid part 120 can be absorbed by the circumferential part 172*i*. That is, according to the present embodiment, a degree of freedom in selecting the materials of the in-phase connecting busbar 170*i* and the housing lid part 120 can be increased.

For example, the housing lid part 120 can be made of aluminum, and the in-phase connecting busbar 170*i* can be made of pure copper. In this case, differences in the degree of temperature rise and the thermal expansion coefficient between the in-phase connecting busbar 170*i* and the housing lid part 120 result in a thermal expansion difference. An influence of the thermal expansion difference is larger in the circumferential part 172*i* than in the radial part 171*i*. In the present embodiment, the circumferential part 172*i* is not fixed to the housing lid part 120. That is, the circumferential part 172*i* can be displaced with respect to the housing lid part 120. Consequently, the circumferential part 172*i* can effectively absorb the thermal expansion difference in the circumferential direction in which the thermal expansion difference is more likely to have an effect as compared with the radial direction. In particular, in the present embodiment, since the circumferential part 172*i* is formed in an arc shape along the circumferential direction of the rotor 150, it is possible to more effectively absorb the thermal expansion difference.

The lead wire 143 (see FIG. 5) of the winding 141 and the distal end part (end part opposite to the proximal end part) of the radial part 171 are connected via the insertion mechanism 180. The insertion mechanism 180 is a mechanism in which a female-side connector and a male-side connector are electrically connected by inserting the male-side connector into the female-side connector. Hereinafter, a connection structure between the lead wire 143 constituting the end part of the winding 141 and the distal end part of the radial part 171 constituting the end part of the busbar (crossover wire) 170 will be described in detail.

In the present embodiment, as illustrated in FIG. 5, the lead wire 143 of the winding 141 functioning as the male-side connector projects toward the housing lid part 120 in the axial direction of the rotor 150. In addition, as illustrated in FIG. 6, a female-side connector 181 constituting the insertion mechanism 180 is provided at the distal end part of the radial part 171.

Figure 10:
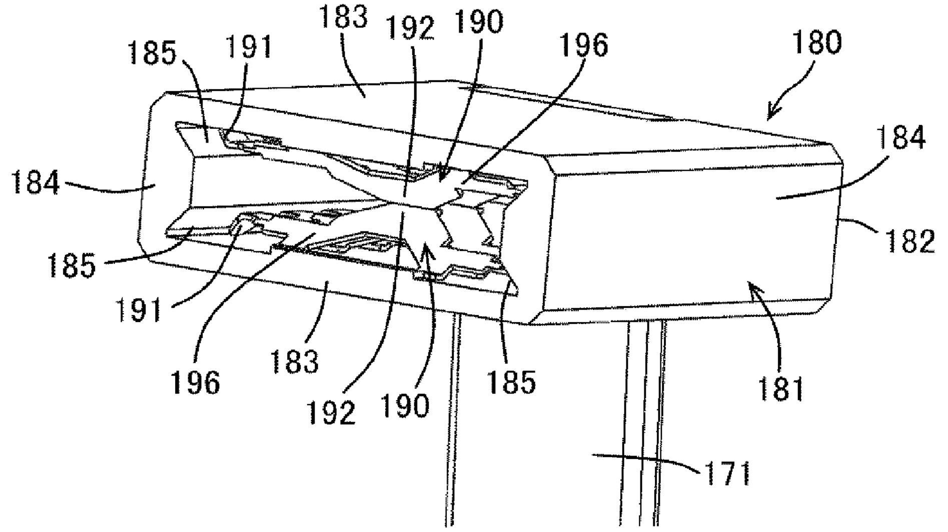
FIG. 10 is a perspective view of an insertion mechanism.
Figure 11:
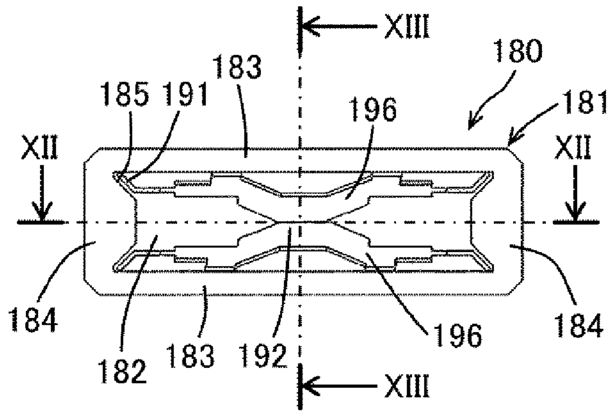
FIG. 11 is a view of the insertion mechanism as viewed from the axial direction.
Figure 12:
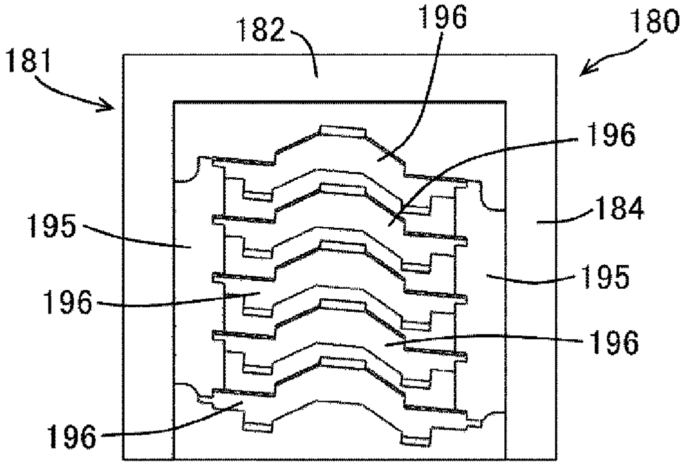
FIG. 12 is a schematic cross-sectional view along line XII-XII in FIG. 11.

An example of a structure of the insertion mechanism 180 will be described in detail with reference to FIGS. 10 to 13. FIG. 10 is a perspective view of the insertion mechanism 180, FIG. 11 is a view of the insertion mechanism 180 as viewed from the axial direction, and FIG. 12 is a schematic cross-sectional view along line XII-XII in FIG. 11. FIG. 13 is a view for illustrating a connection structure between a spring terminal 190 of the insertion mechanism 180 and the lead wire 143 of the winding 141 and illustrates a cross section along line XIII-XIII in FIG. 11.

As illustrated in FIGS. 10 to 12, the insertion mechanism 180 includes a pair of spring terminals 190 having conductivity and elasticity, the female-side connector 181 that holds the pair of spring terminals 190, and the lead wire 143 (see FIG. 5) of the winding 141 as the male-side connector. The female-side connector 181 is a conductive member having a hollow rectangular parallelepiped shape with one end side opened and is fixed to the distal end part of the radial part 171. As a method of fixing the female-side connector 181 and the distal end part of the radial part 171, a fixing method such as press fitting, welding, or bolt fastening can be employed. Note that tough pitch copper can be used as the material of the female-side connector 181 unless the fixing method such as welding reaching a high temperature is employed.

As illustrated in FIG. 13, the lead wire 143 of the winding 141 is inserted into the female-side connector 181. The lead wire 143 of the winding 141 is inserted into a space between the pair of spring terminals 190 to deform the spring terminals 190.

As illustrated in FIG. 10, the female-side connector 181 is formed in a bottomed rectangular box shape which is open on the housing body 110 side. The female-side connector 181 has a rectangular plate-shaped bottom part 182 fixed to a distal end part of the radial part 171, a pair of wide plate parts 183 connected to a pair of long sides of the bottom part 182, and a pair of narrow plate parts 184 connected to a pair of short sides of the bottom part 182.

As illustrated in FIG. 12, the spring terminal 190 includes a plurality of leaf springs 196 and a pair of connection plates 195 connecting the plurality of leaf springs 196 to each other.

As illustrated in FIG. 11, the leaf spring 196 has female-side contact parts 191 formed to be electrically connected to the female-side connectors 181, at both end parts of the bottom part 182 in a longitudinal direction (right-left direction in the drawing). The leaf spring 196 has a male-side contact part 192 formed to be electrically connected to the lead wire 143 of the winding 141, at the central part of the bottom part 182 in the longitudinal direction (right-left direction in the drawing).

The narrow plate part 184 has a projecting part formed to project inward at a central part of the bottom part 182 in a transverse direction (vertical direction in the drawing). The narrow plate part 184 has recesses 185 in which the female-side contact parts 191 of the spring terminals 190 are arranged and which are formed at both end parts of the bottom part 182 in the transverse direction (vertical direction in the drawing).

As illustrated in FIG. 13, the pair of spring terminals 190 is arranged to have a V shape in which a pair of leaf springs 196 facing each other opens toward the opening surface side (left side in the drawing) of the female-side connector 181. The leaf spring 196 generates an elastic force from the wide plate part 183 side toward the inside.

When the lead wire 143 of the winding 141 is inserted into the female-side connector 181, the lead wire 143 of the winding 141 comes into contact with the male-side contact part 192 of the leaf spring 196, and the leaf spring 196 is bent such that the male-side contact part 192 approaches the wide plate part 183 side. Consequently, an elastic force (biasing force) acts from the leaf spring 196 toward the lead wire 143, so that the male-side contact part 192 of the leaf spring 196 and the lead wire 143 are firmly connected.

In the present embodiment, since the pair of spring terminals 190 is provided to face each other, the lead wire 143 is pinched from both sides by the pair of spring terminals 190. As described above, in the present embodiment, the lead wire 143 of the winding 141 is brought into insertion contact with the insertion mechanism 180, and thereby the lead wire 143 of the winding 141 and the end part of the busbar 170 are electrically connected. The insertion contact means that the male-side connector (lead wire 143 of the winding 141 in the present embodiment) is inserted into the female-side connector 181, and thereby both connectors are directly or indirectly brought into contact with each other.

In the present embodiment, an insertion direction of the insertion mechanism 180 is a direction along the rotation axis O of the rotor 150. That is, the insertion mechanism 180 according to the present embodiment has a configuration in which the lead wire 143 of the winding 141 is inserted into the female-side connector 181 in parallel with the rotation axis O of the rotor 150. Therefore, when the housing lid part 120 is attached to the housing body 110 in the axial direction, the lead wire 143 of the winding 141 is inserted into the insertion mechanism 180 in the axial direction, and the end part (lead wire 143) of the winding 141 and the end part (distal end part of the radial part 171) of the busbar 170 are electrically connected through the insertion contact by the insertion mechanism 180.

That is, according to the present embodiment, in one process, the housing lid part 120 and the housing body 110 are connected, and the end part (lead wire 143) of the winding 141 and the end part (distal end part of the radial part 171) of the busbar 170 are connected. As described above, in the present embodiment, since an assembly process of the in-wheel motor 100 is simplified, the manufacturing costs of the in-wheel motor 100 can be reduced. In addition, in the present embodiment, since a structure in which the lead wire 143 of the winding 141 does not come off from the female-side connector 181 unless the housing lid part 120 is detached from the housing body 110, the connection between the winding 141 and the busbar 170 is highly reliable.

In the present embodiment, the insertion mechanism 180 has the spring terminal 190, and the end part (lead wire 143) of the winding 141 and the end part of the busbar (crossover wire) 170 are connected via the spring terminal 190. Consequently, since the end part (lead wire 143) of the winding 141 and the end part of the busbar (crossover wire) 170 are electrically connected by a reaction force (elastic force) of the spring terminal 190, a stable contact-point contact force can be obtained even when an insertion force in the axial direction is weak.

In addition, in the present embodiment, the leaf spring 196 is attached in such a direction as to be opened toward an inlet side of the insertion mechanism 180. Consequently, even when the male-side connector (lead wire 143 of the winding 141) is slightly shifted and inserted into the female-side connector 181, the spring terminal 190 functions as a guide for the male-side connector, so that the male-side connector can be appropriately brought into contact with the female-side connector 181.

The leaf spring 196 of the spring terminal 190 is three-dimensionally formed from a plate-shaped member. The contact resistance decreases as the number of contact points of the male-side connector (lead wire 143 of the winding 141) with the spring terminal 190 and the number of contact points of the female-side connector 181 with the spring terminal 190 increase. In the present embodiment, since the spring terminal 190 has the plurality of leaf springs 196, and the spring terminal 190 is in contact with the lead wire 143 of the winding 141 and the female-side connector 181 at a plurality of positions, the contact resistance can be reduced. Hence, in the present embodiment, a large current can be supplied to the insertion mechanism 180.

As a material of the spring terminal 190, beryllium copper, phosphor bronze, stainless steel (SUS), or the like having a low electrical resistivity and a high elastic limit can be employed. Note that the surface of the spring terminal 190 and a surface of the lead wire 143 of the winding 141 are desirably plated with the same material. The lead wire 143 of the winding 141 is plated after the insulation film is removed. By plating the surface of the spring terminal 190 and the surface of the lead wire 143 of the winding 141 with the same material, wear and electrolytic corrosion thereof can be prevented. For plating, silver plating, nickel plating, or the like can be employed.

When the housing lid part 120 is connected to the housing body 110, the inside of the housing 101 becomes a sealed space. As illustrated in FIG. 3, this space serves as a flow channel 119 in which a liquid refrigerant flows. That is, the housing 101 includes therein the flow channel 119 in which the liquid refrigerant flows. The liquid refrigerant is, for example, an automatic transmission fluid (ATF), engine oil, vegetable oil such as palm oil, or electrical insulation oil such as mineral oil. The liquid refrigerant circulates in a cooling system including a pump and a heat exchanger (not illustrated).

The housing 101 has a refrigerant inlet 129 through which the liquid refrigerant flows into the housing 101 and a refrigerant outlet (not illustrated) through which the refrigerant having flowed through the flow channel 119 flows out of the inside of the housing 101. The rotor 150 and the stator 130 are arranged in the flow channel 119.

The liquid refrigerant discharged from the pump (not illustrated) is supplied from the refrigerant inlet 129 to the flow channel 119 inside the housing 101, directly cools the rotor 150 and the stator 130, and is discharged from the refrigerant outlet to the outside of the housing 101. The liquid refrigerant discharged from the refrigerant outlet is supplied from the refrigerant inlet 129 into the housing 101 again by a pump (not illustrated).

Note that the liquid refrigerant may not only cool the rotor 150 and the stator 130 but also lubricate and cool a bearing (not illustrated). The liquid refrigerant preferably has not only insulation properties but also properties such as low viscosity, high temperature resistance, and lubricity.

In the present embodiment, the end part of the winding 141 and the end part of the busbar 170 are connected through insertion contact. Therefore, as compared with the case where the end part of the winding 141 and the end part of the busbar 170 are connected by welding (welding adhesion), the contact resistance is high and the calorific value is high. Therefore, in the present embodiment, as illustrated in FIG. 3, the insertion mechanism 180 is disposed in the flow channel 119 of the liquid refrigerant.

As illustrated in FIG. 3, in the present embodiment, the winding 141, the busbar (crossover wire) 170, and the insertion mechanism 180 are arranged in the flow channel 119 and are in contact with the liquid refrigerant. Therefore, the winding 141, the busbar (crossover wire) 170, and the insertion mechanism 180 are effectively cooled by the circulating liquid refrigerant. In addition, the heat generated by the insertion mechanism 180 is not only transmitted to the housing lid part 120 via the busbar 170 but also effectively transmitted to the housing lid part 120 via the liquid refrigerant. The heat transmitted to the housing lid part 120 is dissipated from the housing lid part 120 to the outside (atmosphere). Therefore, according to the present embodiment, the insertion mechanism 180 can be efficiently cooled as compared with a case where the insertion mechanism 180 and the busbar (crossover wire) 170 are arranged in the air.

As illustrated in FIG. 3, when the rotor 150 is disposed in the flow channel 119, the liquid refrigerant is drawn by the rotation of the rotor 150 to flow in the circumferential direction. Here, in a case where the radial parts 171 are not arranged in the recess 126 (see FIGS. 6 and 8) and farther project from the surface (main surface 121) of the housing lid part 120, the flow resistance of the liquid refrigerant may increase, thus resulting in deterioration of motor efficiency.

On the other hand, in the present embodiment, as illustrated in FIG. 8, the radial parts 171 of the busbars 170 are arranged in the recess 126 provided in the housing lid part 120, and the circumferential part 172 of one busbar 170 intersects a radial part 171 of another busbar 170 at a position farther away from the housing lid part 120 than the radial part 171 of the other busbar 170.

Since the radial parts 171 of the busbars 170 are arranged in the recess 126 of the housing lid part 120, the flow resistance of the liquid refrigerant can be reduced. Although the circumferential part 172 projects from the surface (main surface 121) of the housing lid part 120, the liquid refrigerant mainly flows in the circumferential direction during the rotation of the rotor 150, and thus an influence thereof on the flow resistance of the liquid refrigerant is small. Since the circumferential part 172 projects from the surface (main surface 121) of the housing lid part 120, the circumferential part is actively cooled by the liquid refrigerant.

According to the above-described embodiment, the following operational effects are obtained.

The in-wheel motor (rotary electrical machine) 100 according to the present embodiment includes the cylindrical stator 130 that generates a magnetic field, the rotor 150 that generates torque through the magnetic field, and the housing 101 that accommodates the stator 130. The housing 101 includes the housing body 110 covering an outer circumferential part of the stator 130 and the housing lid part 120 attached to one end side of the housing body 110. The stator 130 includes the stator core 131 having the plurality of teeth 132 and the stator coil 140 mounted on the stator core 131. The stator coil 140 has the plurality of windings 141 wound onto the plurality of teeth 132 and the busbars (crossover wires) 170 that are each provided to connect at least two of the plurality of windings 141. The busbars 170 are provided in the housing lid part 120. Further, the in-wheel motor 100 includes an insertion mechanism 180 that electrically connects the lead wires (end parts) 143 of the windings 141 and the end parts (distal end parts of the radial parts 171) of the busbars 170 through insertion contact.

According to this configuration, in one process at the time of assembling the in-wheel motor 100, the housing lid part 120 is attached to the housing body 110, and the end parts of the windings 141 and the end parts of the busbars 170 are electrically connected through insertion contact. Hence, according to the present embodiment, the assemblability of the in-wheel motor 100 can be improved.

In addition, in the present embodiment, since the busbars 170 are provided in the housing lid part 120, there is no need to provide a connection plate (busbar unit) which is a member for holding the busbars 170, separately from the housing lid part 120. Hence, according to the present embodiment, an axial length of the in-wheel motor 100 can be shortened as compared with the case where the connection plate is provided separately from the housing lid part 120.

Further, in the present embodiment, the busbar 170 is provided in the housing lid part 120, and the radial part (part of the crossover wire) 171 is in contact with the housing lid part 120. Consequently, the heat generated by the insertion mechanism 180 is transmitted to the housing lid part 120 having a large heat capacity via the busbar (crossover wire) 170 and is dissipated from the housing lid part 120 to the outside (atmosphere). Since the insertion mechanism 180 can be effectively cooled, the amount of energization to the stator coil 140 can be increased. As a result, by increasing the motor efficiency of the in-wheel motor 100, energy saving performance can be improved.

In addition, in the in-wheel motor 100 according to the present embodiment, since the end part of the winding 141 and the end part of the busbar (crossover wire) 170 are electrically connected through insertion contact by the insertion mechanism 180, there is no need to perform welding work between the end part of the winding 141 and the end part of the busbar (crossover wire) 170. Hence, according to the present embodiment, the amount of energy used at the time of manufacturing the in-wheel motor 100 can be reduced, and thus the environmental load can be reduced.

In the present embodiment, the end parts of the adjacent windings 141 of the stator coil 140 are connected to each other, and at least two windings 141 are formed to be continuous. According to this configuration, the number of insertion mechanisms 180 can be reduced. As a result, the cost of the in-wheel motor 100 can be reduced. In addition, since variations in contact resistance can be reduced, variations in performance can be reduced. Further, reliability of the in-wheel motor 100 can be enhanced. In addition, the number of components of the in-wheel motor 100 can be reduced, and the in-wheel motor 100 can be reduced in size.

The following modification examples are also included within the scope of the present invention, and it is also possible to combine configurations described in the modification examples with the configurations described in the above-described embodiment or combine the configurations described in the following different modification examples.

Modification Example 1

In the above-described embodiment, the lead wire 143 of the winding 141 is formed as the male-side connector, and the female-side connector 181 is provided at the distal end part of the radial part 171 of the busbar 170. In the above-described embodiment, the lead wire 143 of the winding 141 is inserted into the female-side connector 181, and the lead wire 143 of the winding 141 is electrically connected to the end part of the busbar 170 through the insertion contact in which the lead wire 143 is in contact with the female-side connector 181 via the spring terminal 190. However, the method of connecting the winding 141 and the busbar (crossover wire) 170 is not limited thereto. A female-side connector may be formed at the lead wire 143 of the winding 141, and a male-side connector may be formed at the end part of the busbar 170.

Modification Example 2

Figure 14:
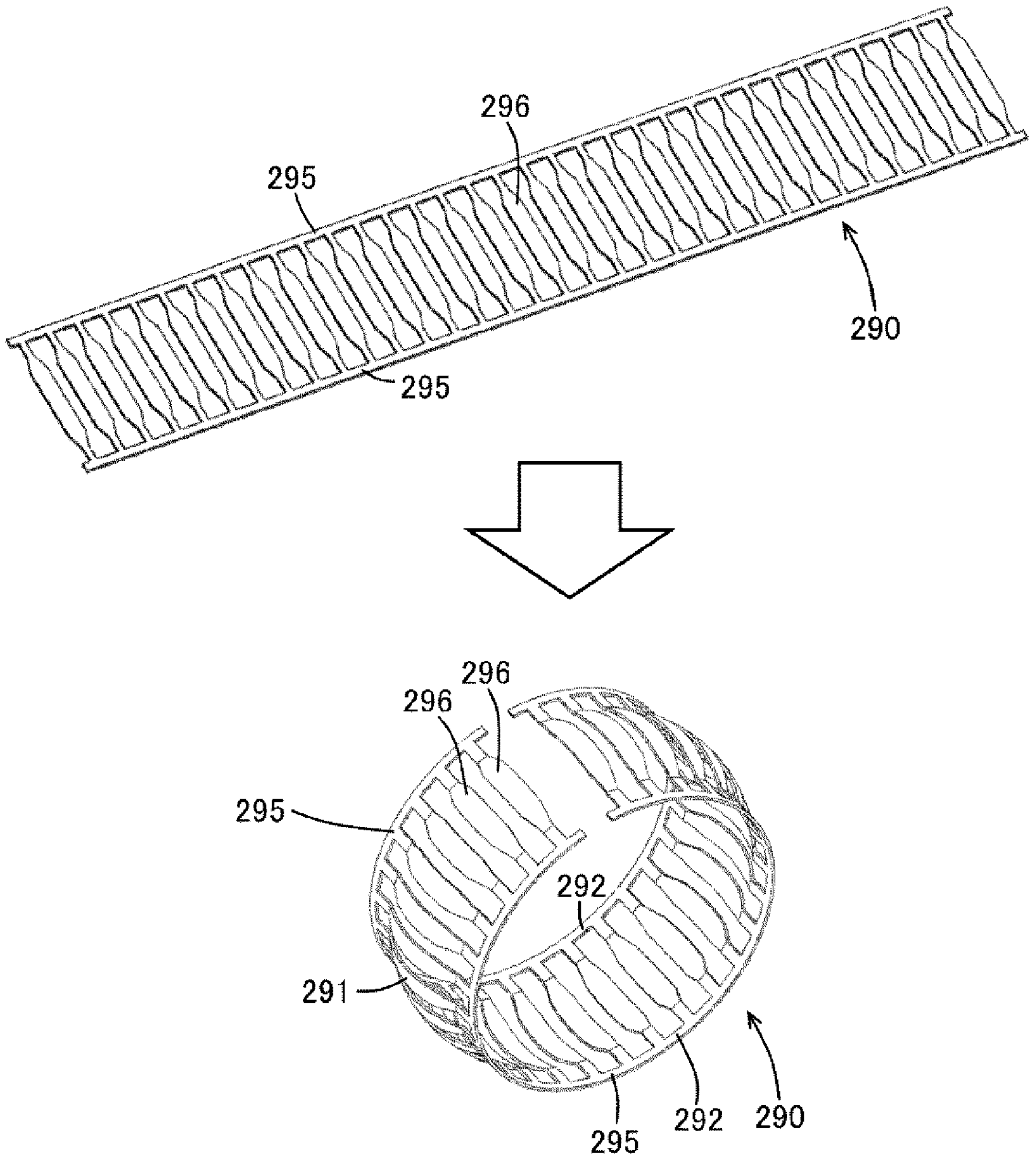
FIG. 14 is a view for illustrating a spring terminal according to Modification Example 2.

In the above-described embodiment, the example in which the spring terminal 190 provided in the insertion mechanism 180 is configured to pinch the rectangular wire having a rectangular cross section from both sides is described, but the present invention is not limited thereto. A spring terminal 290 that connects a rod-like male-side connector having a circular cross section and a cylindrical female-side connector will be described with reference to FIG. 14. FIG. 14 is a view for illustrating the spring terminal 290 according to Modification Example 2.

As illustrated in FIG. 14, the spring terminal 290 includes a plurality of leaf springs 296 and a pair of connection plates 295 connecting the plurality of leaf springs 296 and is bent and formed in an annular shape. The spring terminal 290 bent and formed in the annular shape is mounted on the rod-like male-side connector in advance, for example. The spring terminal 290 has a male-side contact part 292 provided at the connection plate 295, and the male-side contact part 292 is in contact with the male-side connector.

When the male-side connector on which the spring terminal 290 is mounted is inserted into the female-side connector, the female-side contact part 291 is bent inward in the radial direction of the annular spring terminal 290. Consequently, an elastic force (biasing force) acts from the leaf spring 296 toward an inner circumferential surface of the female-side connector, so that the female-side contact part 291 of the leaf spring 296 and the female-side connector are firmly connected.

Modification Example 3

In the above-described embodiment, the example in which the spring terminal 190 includes the leaf spring 196 is described, but the present invention is not limited thereto. The spring terminal may be configured to include a compression coil spring having one end part in contact with the male-side connector and the other end in contact with the female-side connector. When the compression coil spring is compressed in the axial direction, the reaction force thereof causes the one end part of the compression coil spring to be pressed against the male-side connector and the other end part of the compression coil spring to be pressed against the female-side connector.

Modification Example 4

A coil spring having a small wire diameter and a small average diameter and a long free length, such as a coil spring for a ballpoint pen core, may be wound around the male-side connector and inserted into the female-side connector. In this case, a cylinder surface of the coil spring is deformed to be crushed, and the male-side connector and the female-side connector are connected by a radial reaction force of the coil spring.

Modification Example 5

In the above-described embodiment, the example in which the end part of the winding 141 and the end part of the busbar (crossover wire) 170 are connected via the spring terminal 190 is described, but the present invention is not limited thereto. The male-side connector and the female-side connector may be directly connected by, for example, providing the male-side connector at one of the end part of the winding 141 and the end part of the busbar (crossover wire) 170, providing the female-side connector at the other, and press-fitting the male-side connector into the female-side connector.

Modification Example 6

In the above-described embodiment, the example in which the recess 126 in which the radial parts 171 of the busbars 170 are arranged is formed in the housing lid part 120 is described, but the present invention is not limited thereto. At least by fixing the radial parts 171 of the busbars 170 to the housing lid part 120, rigidity of the housing lid part 120 can be enhanced.

Modification Example 7

Figure 15:
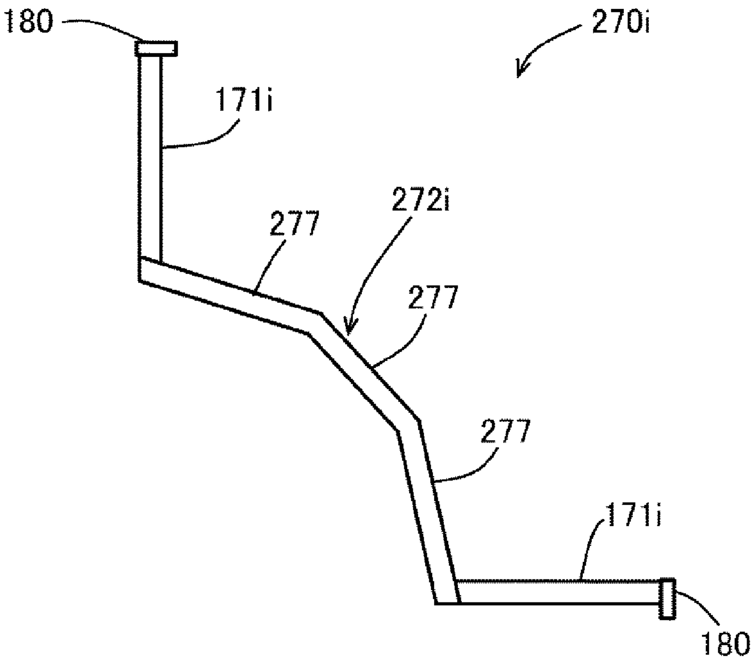
FIG. 15 is a view for illustrating an in-phase connecting busbar according to Modification Example 7.

In the above-described embodiment, the example in which the circumferential part **172*i* of the in-phase connecting busbar 170*i* is formed in the arc shape is described, but the present invention is not limited thereto. As illustrated in FIG. 15, a circumferential part 272*i* of an in-phase connecting busbar 270*i* may have a shape in which a plurality of linear parts 277 are connected in the circumferential direction. According to this configuration, similarly to the above-described embodiment, it is possible to effectively absorb the thermal expansion difference between the housing lid part 120 and the in-phase connecting busbar 270*i*. Although not illustrated, the circumferential part 172*i* of the in-phase connecting busbar 170*i*** may be a single linear member.

Modification Example 8

In the above-described embodiment, the example in which the liquid refrigerant discharged from the pump is supplied to the inside of the housing 101 is described, but the present invention is not limited thereto. The liquid refrigerant may be scraped up using the rotational force of the rotor 150 and sprayed to the stator coil 140, the insertion mechanism 180, and the like.

Modification Example 9

In the above-described embodiment, the inner rotor type in-wheel motor 100 in which the rotor 150 is provided on an inner diameter side of the stator 130 is described as an example, but the present invention is not limited thereto. The present invention may be applied to an outer rotor type in-wheel motor in which the rotor 150 is provided on an outer diameter side of the stator 130.

Modification Example 10

The shape of the housing 101 is not limited to that described in the above-described embodiment. Note that it is preferable that the housing 101 include a plurality of ribs, fins, and the like in order to efficiently release the heat transmitted from the busbar (crossover wire) 170, the stator core 131, and the liquid refrigerant in contact with the housing 101 to the atmosphere.

Modification Example 11

In the above-described embodiment, the example in which the insertion mechanism 180 is disposed in the flow channel 119 in which the liquid refrigerant flows is described, but the present invention is not limited thereto. In a case where a temperature rise of the insertion mechanism 180 can be effectively suppressed, such as a case where a contact area between the busbar 170 and the housing lid part

120 is sufficiently obtained, the insertion mechanism 180 may not be provided in the flow channel 119 of the liquid refrigerant.

Modification Example 12

In the above-described embodiment, the example in which the rotary electrical machine is the in-wheel motor 100 provided in the wheel 197 is described, but the present invention is not limited thereto. The rotary electrical machine may be a motor that is attached to a vehicle body and generates a traveling driving force of an automobile. In addition, the rotary electrical machine is not limited to the case of being mounted on an automobile. The present invention can be applied to various rotary electrical machines that generate a driving force of a moving body such as an elevator or a railway vehicle. Further, the rotary electrical machine is not limited to a case where the rotary electrical machine is mounted on a moving body. The present invention can be applied to a rotary electrical machine mounted on various machines such as a compressor and an air conditioner.

The embodiments of the present invention are described above; however, the above-described embodiments merely represent some application examples of the present invention, and the technical scope of the present invention is not intended to be limited to the specific configurations of the above-described embodiments.

REFERENCE SIGNS LIST

1 electric wheel system
100 in-wheel motor (rotary electrical machine)
101 housing
110 housing body
119 flow channel
120 housing lid part
121 main surface
122 annular recess
126 recess
130 stator
131 stator core
132 teeth
133 yoke
140 stator coil
141 winding
142 winding group
143 lead wire (end part of winding)
150 rotor
151 rotor core
170 busbar (crossover wire)
170*i*, 270*i* in-phase connecting busbar (crossover wire)
170*n* neutral-point connecting busbar (crossover wire)
171, 171*i*, 171*n* radial part (part of crossover wire)
172, 172*i*, 172*n*, 272*i* circumferential part (connection part)
180 insertion mechanism
181 female-side connector
190, 290 spring terminal
196, 296 leaf spring
277 linear part

The invention claimed is:

1. A rotary electrical machine comprising:
a cylindrical stator that generates a magnetic field;
a rotor that generates torque through the magnetic field; and
a housing that accommodates the stator,
wherein the housing includes a housing body covering an outer circumferential part of the stator, and a housing lid part attached to one end side of the housing body,
the stator includes a stator core having a plurality of teeth, and a stator coil mounted on the stator core,
the stator coil has a plurality of windings wound onto the plurality of teeth, and crossover wires that are each provided to connect at least two of the plurality of windings,
the crossover wires are provided in the housing lid part, and
the rotary electrical machine comprises an insertion mechanism that electrically connects end parts of the windings and an end part of each of the crossover wires through insertion contact.

2. The rotary electrical machine according to claim 1, wherein
the insertion mechanism includes a spring terminal having conductivity and elasticity, and
the end parts of the windings and the end part of each of the crossover wires are connected via the spring terminal.

3. The rotary electrical machine according to claim 1, wherein an insertion direction of the insertion mechanism is a direction along a rotation axis of the rotor.

4. The rotary electrical machine according to claim 1, wherein a part of each of the crossover wires is in contact with the housing lid part.

5. The rotary electrical machine according to claim 4, wherein
the crossover wire has a plurality of radial parts provided in a radial direction of the rotor and a connection part connecting the plurality of radial parts,
the radial part is fixed to the housing lid part, and
an end part of the crossover wire is a distal end part of the radial part extending from the connection part in the radial direction of the rotor.

6. The rotary electrical machine according to claim 5, wherein the end parts of the adjacent windings of the stator coil are connected to each other, and at least two windings are formed to be continuous.

7. The rotary electrical machine according to claim 5, wherein
each of the crossover wires includes a pair of the radial parts and the connection part that connects the pair of radial parts to each other,
a central part of the connection part is disposed radially outward from an imaginary line connecting both end parts of the connection part, and
the connection part is relatively displaceable with respect to the housing lid part.

8. The rotary electrical machine according to claim 7, wherein
the connection part is a circumferential part provided in a circumferential direction of the rotor, and
the circumferential part has an arc shape or a shape in which a plurality of linear parts are connected.

9. The rotary electrical machine according to claim 5, wherein
the connection part is a circumferential part provided in a circumferential direction of the rotor, and
the housing includes a flow channel in which a liquid refrigerant flows,
the crossover wires are arranged in the flow channel,
the radial parts are arranged in a recess provided in the housing lid part, and the circumferential part of one of the crossover wires intersects a radial part of the other one of the crossover wires at a position farther away from the housing lid part than a radial part of the other one of the crossover wires.

10. The rotary electrical machine according to claim 1, wherein the housing includes a flow channel in which a liquid refrigerant flows, and the insertion mechanism and the crossover wires are arranged in the flow channel.

* * * * *